US 12,487,386 B2

United States Patent
Zhang et al.

(10) Patent No.: US 12,487,386 B2
(45) Date of Patent: Dec. 2, 2025

(54) COLOR FILM SUBSTRATE AND DISPLAY PANEL

(71) Applicant: HKC CORPORATION LIMITED, Shenzhen (CN)

(72) Inventors: Jianying Zhang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 432 days.

(21) Appl. No.: 18/066,133

(22) Filed: Dec. 14, 2022

(65) Prior Publication Data

US 2023/0367048 A1    Nov. 16, 2023

(30) Foreign Application Priority Data

May 13, 2022 (CN) .......... 202210521421.3

(51) Int. Cl.
*G02B 1/16* (2015.01)
*G02B 5/20* (2006.01)

(52) U.S. Cl.
CPC .............. *G02B 5/201* (2013.01); *G02B 1/16* (2015.01); *G02B 5/208* (2013.01)

(58) Field of Classification Search
CPC .......... G02B 5/201; G02B 1/16; G02B 5/208; G02F 1/133512; G02F 1/133514
See application file for complete search history.

(56) References Cited

U.S. PATENT DOCUMENTS

2018/0088413 A1*  3/2018  Jang ................. G02F 1/133509

FOREIGN PATENT DOCUMENTS

| CN | 101408696 | 4/2009 |
|---|---|---|
| CN | 201984175 | 9/2011 |
| CN | 104049798 | 9/2014 |
| CN | 105549258 | 5/2016 |
| CN | 107430340 | 12/2017 |
| CN | 107870474 | 4/2018 |
| CN | 113759661 | 12/2021 |
| CN | 215219370 | 12/2021 |

OTHER PUBLICATIONS

CN 215219370 U (Xue, Xing-hao et al.) machine translation (Year: 2021).*
CN 105549258 A (Gu, Ying-bin) machine translation (Year: 2016).*
CNIPA, Office Application for CN Application No. 202210521421. 3, Feb. 11, 2023.

* cited by examiner

*Primary Examiner* — James A Dudek
(74) *Attorney, Agent, or Firm* — Hodgson Russ LLP

(57) ABSTRACT

A color film substrate includes a substrate and a color resist layer arranged on the substrate. The color resist layer includes red, green and blue color resist areas. The color film substrate further includes a light absorption layer located on the substrate, the color resist layer and the light absorption layer being arranged in sequence in a light output direction. The light absorption layer includes first to third light absorption areas. The first to third light absorption areas are disposed corresponding to the red, green and blue color resist areas, respectively. The first light absorption area absorbs near-infrared light transmitted by the red color resist area. The second light absorption area absorbs yellow light transmitted by the green color resist area. The third light absorption area absorbs short-wave blue light transmitted by the blue color resist area.

18 Claims, 6 Drawing Sheets

COLOR FILM SUBSTRATE AND DISPLAY PANEL

CROSS-REFERENCE TO RELATED APPLICATION

This application claims priority to Chinese Patent Application No. 202210521421.3, filed May 13, 2022, the entire disclosure of which is incorporated herein by reference.

FIELD OF TECHNOLOGY

The present disclosure relates to the display field and, more particularly, to a color film substrate and a display panel.

BACKGROUND

Display devices usually use color resist layers containing red, green and blue color resist areas to filter light, so as to achieve display in different colors. However, the light transmitted through the red, green and blue color resist areas has a large wavelength range, so the display device cannot restore a high chroma monochrome, thereby reducing the display color gamut. In addition, the red color resist area will transmit infrared light (wavelength 750 nm-1000 nm), and the blue color resist area will transmit high-energy short-wave blue light (wavelength 400 nm-450 nm), which is easy to cause harm to human eyes.

SUMMARY

There are provided a color film substrate and a display device according to embodiments of the present disclosure. The technical solution is as below:

According to a first aspect of the present disclosure, there is provided a color film substrate including a substrate and a color resist layer arranged on the substrate, the color resist layer including a red color resist area, a green color resist area and a blue color resist area. The color film substrate also includes a light absorption layer located on the substrate, the color resist layer and the light absorption layer are arranged in sequence in a light output direction. The light absorption layer includes first to third light absorption areas. The first light absorption area is correspondingly arranged with the red color resist area, the second light absorption area is correspondingly arranged with the green color resist area, and the third light absorption area is correspondingly arranged with the blue color resist area. The first light absorption area absorbs near-infrared light transmitted by the red color resist area. The second light absorption area absorbs yellow light transmitted by the green color resist area. The third light absorption area absorbs short-wave blue light transmitted by the blue color resist area.

According to a second aspect of the present disclosure, there is provided a display panel including an array substrate, a color film substrate according to any one described above, the color film substrate and the array substrate are arranged by cell assembling.

It should be understood that the above general description and the following detailed description are exemplary and explanatory only and are not intended to limit the present disclosure.

BRIEF DESCRIPTION OF THE DRAWINGS

The accompanying drawings which are incorporated in and constitute a part of the description illustrate embodiments consistent with the disclosure and together with the description serve to explain the principles of the disclosure. It will be apparent that the drawings described below are only some embodiments of the present disclosure, and other drawings may be obtained from them without creative effort for those of ordinary skill in the art.

DETAILED DESCRIPTION OF THE EMBODIMENTS

Figure 1:
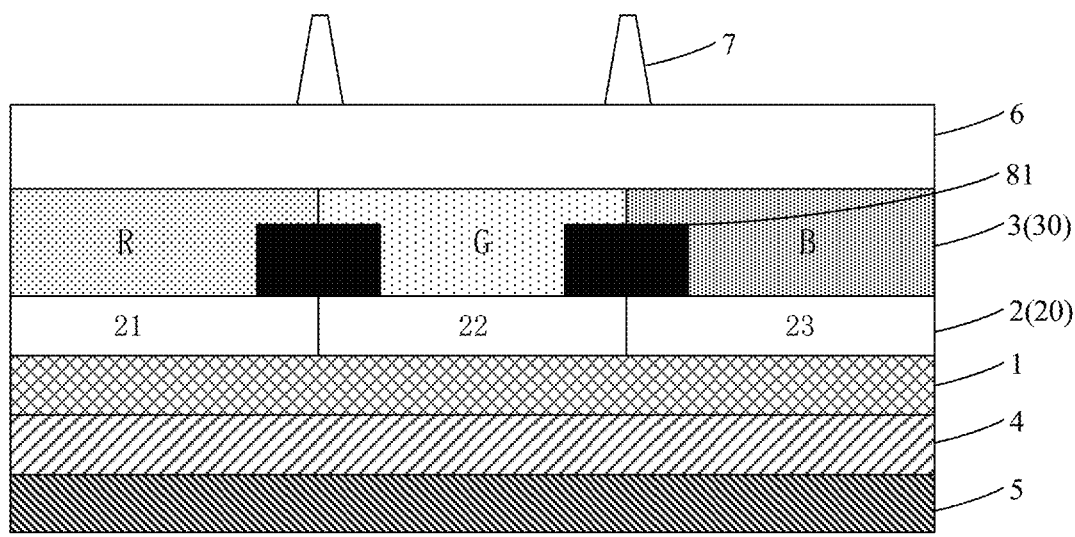
FIG. 1 is a cross-sectional view of a first color film substrate according to embodiment 1 of the present disclosure.

Exemplary embodiments will now be described more comprehensively with reference to the accompanying drawings. However, the exemplary embodiments can be implemented in a variety of forms and should not be construed as being limited to the examples set forth herein. Rather, these embodiments are provided so that the present disclosure will be more comprehensive and complete, and the concept of exemplary embodiments will be fully communicated to those skilled in the art.

In the present disclosure, the terms "first", "second" are used for descriptive purposes only and are not to be construed as indicating or implying relative importance or as implying the number of technical features indicated. Thus, the features defined as "first" or "second" may be explicitly or implicitly defined as including one or more of the features. In the description of the present disclosure, "a plurality of" means two or more, unless explicitly and specifically defined otherwise.

Further, the described features, structures or characteristics may be incorporated in any suitable manner in one or more embodiments. In the following description, many specific details are provided to give a full understanding of the embodiments of the present disclosure. However, those skilled in the art will appreciate that one or more of the technical solutions of the present disclosure may be practiced without particular details, or other methods, group elements, devices, steps, etc. may be employed. In other instances, well-known methods, devices, implementations or operations are not shown or described in detail to avoid obscuring aspects of the present disclosure.

Embodiment 1

As shown in FIGS. 1-14, an embodiment of the present disclosure provides a color film substrate, including a substrate 1 and a color resist layer 3 arranged on the substrate 1. The color resist layer 3 includes a red color resist area R, a green color resist area G and a blue color resist area B. The color film substrate further includes a light absorption layer 2 arranged on the substrate 1, and the color resist layer 3 and the light absorption layer 2 are arranged in sequence in a light output direction. The light absorption layer 2 includes first light absorption area 21, second light absorption area 22 and third light absorption area 23. The first light absorption area 21 is provided corresponding to the red color resist area R, the second light absorption area 22 is provided corresponding to the green color resist area G, and the third light absorption area 23 is provided corresponding to the blue color resist area B. The first light absorption area 21 absorbs the near-infrared light transmitted by the red color resist area R. The second light absorption area 22 absorbs the yellow light transmitted by the green color resist area G. The third light absorption area 23 absorbs short-wave blue light transmitted by the blue color resist area B. The color film substrate will be described in detail with reference to the accompanying drawings.

Referring to FIG. 1, the color resist layer 3 is an optical filter representing a color. Each color resist area 30 of the color resist layer 3 can select a desired band of light waves and reflect off other undesired bands.

Figure 2:
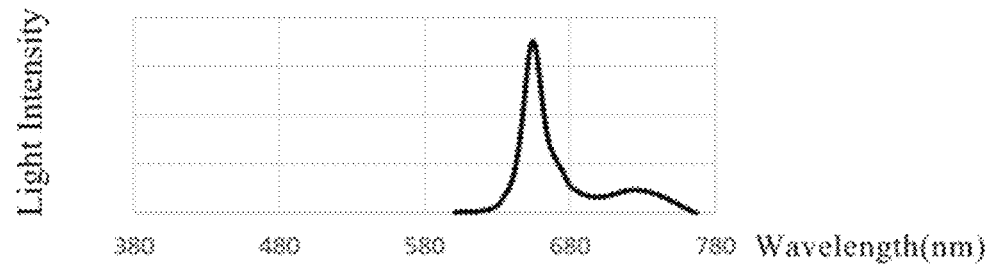
FIG. 2-FIG. 4 respectively show light emission spectrum of red, green and blue color resist areas obtained when no light absorption layer is provided on the color film substrate according to embodiment 1 of the present disclosure.
Figure 3:
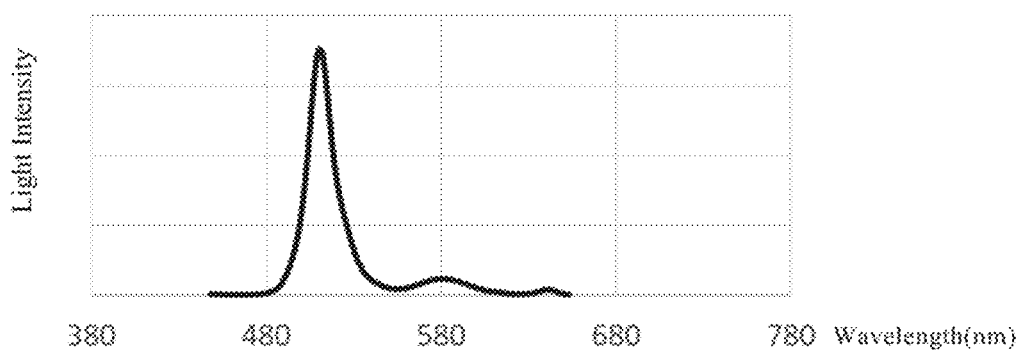
Figure 4:
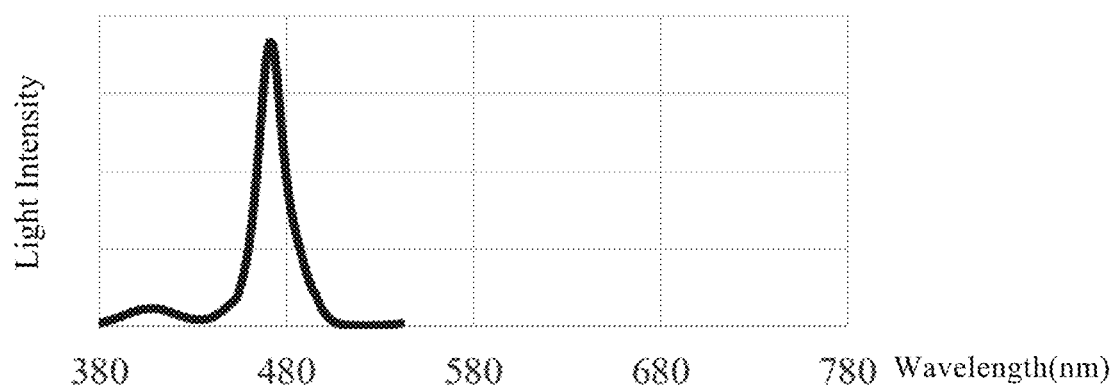

Referring to FIGS. 2-4, the light passing through the respective color resist areas 30 have a wide range of wavelengths including target light and stray light. Although the color resist areas 30 generally have a large transmittance to the target light and a small transmittance to the stray light, a small portion of the stray light also reduces chroma. In other words, the three primary colors passing through the red, green and blue resist areas are not monochromatic light, but mixed light, and the chroma (vividness of the color) of the mixed light is lower than that of RGB monochromatic light. Further, it is difficult to obtain high chroma color by mixing the three primary colors with low chroma, so it is difficult for the display device to restore high chroma monochroma. Therefore, the light absorption area 20 provided in the embodiment of the present disclosure can absorb stray light transmitted by each color resist area 30, thereby improving the purity of light corresponding to each color resist area 30 and further enriching the display effect of the display panel. In addition, since the first light absorption area 21 can absorb near-infrared light and the third light absorption area 23 can absorb high-energy short-wave blue light, it is advantageous to reduce damage to human eyes.

Figure 5:
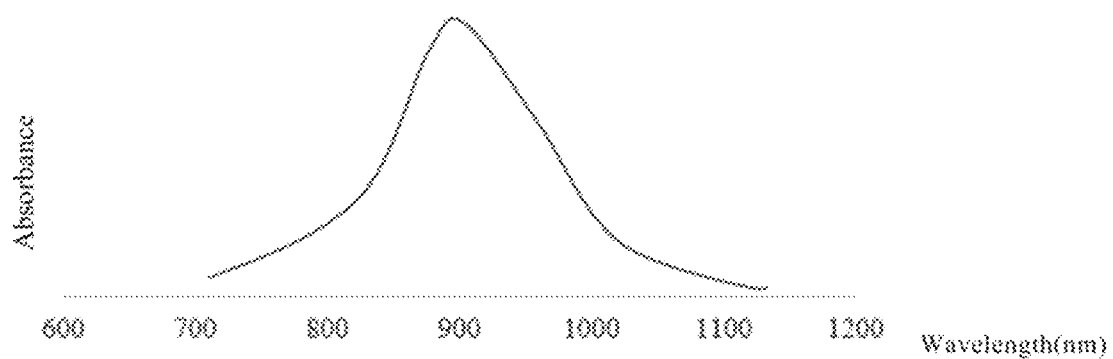
FIG. 5 shows an absorption spectrum of a first light absorption area according to embodiment 1 of the present disclosure.

Referring to FIG. 5, FIG. 5 shows an absorption spectrum of the first light absorption area 21. The first light absorption area 21 can absorb near-infrared light with a wavelength of 700 to 1150 nm. In some embodiments, the first light absorption area 21 is made of an infrared light absorber, such as IRA CD 04 or IRA CD 05 or IRA CD 06.

The second light absorption area 22 may be made of a yellow light absorber for absorbing light with a wavelength of 530 to 640 nm. By way of example, the components of the yellow light absorber may include cyanine dyes, alicyclic compounds, catalysts and solvents. According to the mass ratio, the cyanine dye can be 4 to 8 parts, the alicyclic compound can be 5 to 10 portions, the catalyst can be 0.5 to 1 portion, and the solvent can be 20 to 30 portions. The catalyst can be dibutyltin dilaurate, the cyanine dye is at least one of dimethylene cyanine and trimethylene cyanine, and the alicyclic compound is at least one of N-ethyl morpholine, N-methyl morpholine and N, N'-diethyl piperazine. The solvent is acetone.

Figure 6:
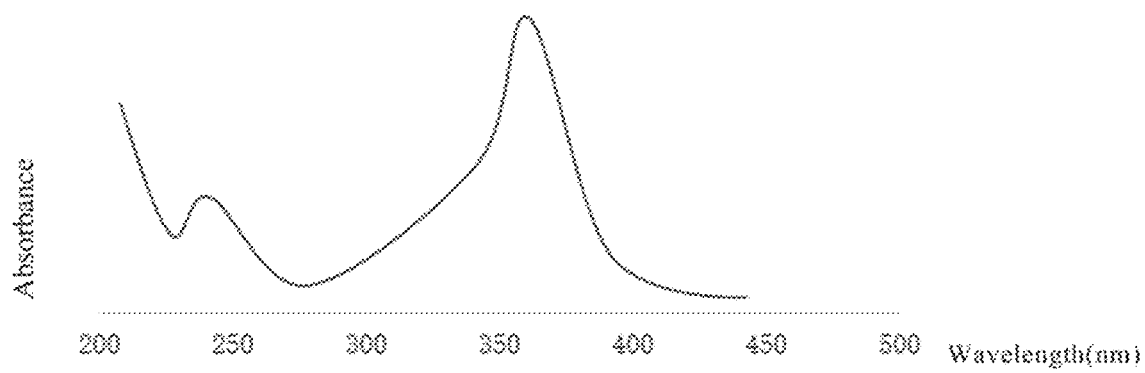
FIG. 6 shows an absorption spectrum of a third light absorption area according to embodiment 1 of the present disclosure.

Referring to FIG. 6, FIG. 6 shows an absorption spectrum of a third light absorption area 23. The third light absorption area 23 is used for absorbing light having a wavelength of 200 to 450 nm. The third light absorption area 23 may be made of a blue light absorber such as BL1226 or a substance such as H53 or H51.

In some embodiments, the light absorption layer 2 has a thickness of 1.0 μm to 2.0 μm. It is worth noting that if the thickness of the light absorption layer 2 is too small, its light absorption ability may be too weak to effectively absorb stray light. If the thickness of the light absorption layer 2 is too large, it may affect the light transmittance. When the thickness of the light absorption layer 2 is within the above range, both of the above problems can be taken into account, thereby ensuring the display effect.

Figure 7:
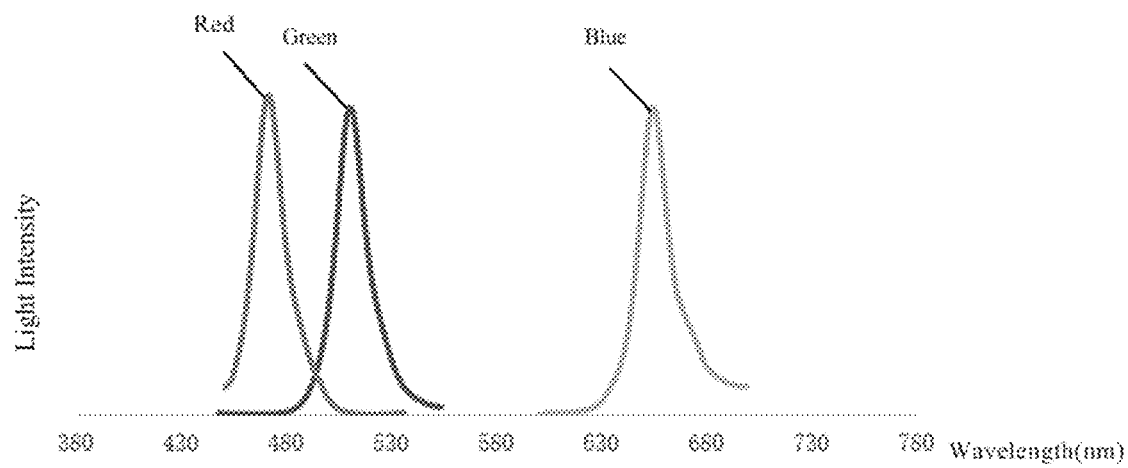
FIG. 7 shows a light emission spectrum of RGB three colors obtained after the light absorption layer is arranged on the color film substrate according to embodiment 1 of the present disclosure.

Referring to FIG. 7, FIG. 7 shows a light emission spectrum of RGB three colors obtained after the light absorption layer 2 is arranged on the color film substrate. It is not difficult to find that after being filtered by the light absorption layer 2, the components of light with different wavelengths are relatively reduced, and the chroma of RGB monochromatic light is improved, thereby enriching the display effect of the display panel and improving the color gamut of the display panel.

Figure 8:
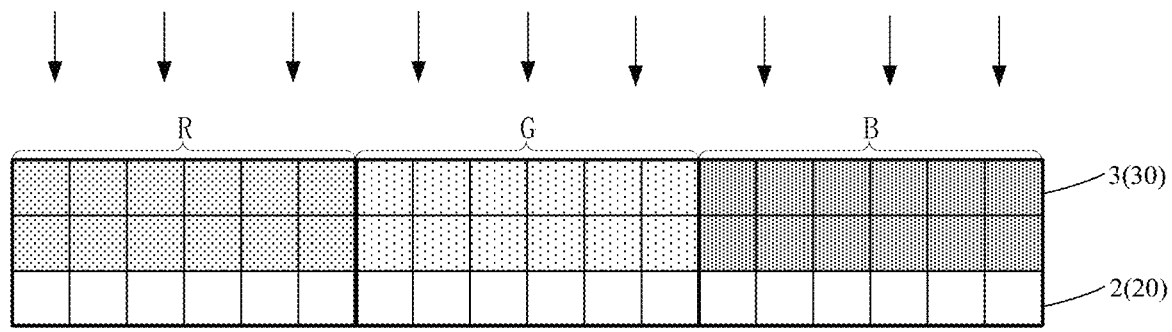
FIG. 8 is an enlarged view of a light absorption layer and a color resist layer according to embodiment 1 of the present disclosure.

FIG. 8 is an enlarged view of the light absorption layer 2 and the color resist layer 3 provided by the embodiment of the present disclosure, and small squares in FIG. 8 are used to represent the light-absorbing particles (molecules) constituting the light absorption layer 3 and the color-resisting particles (molecules) constituting the color resist layer 3. As can be seen from FIG. 8, when the light absorption layer 2 and the color resist layer 3 are provided independently, the particles of the two layers do not need to be mixed, so that the color shift caused by uneven mixing can be avoided.

Figure 9:
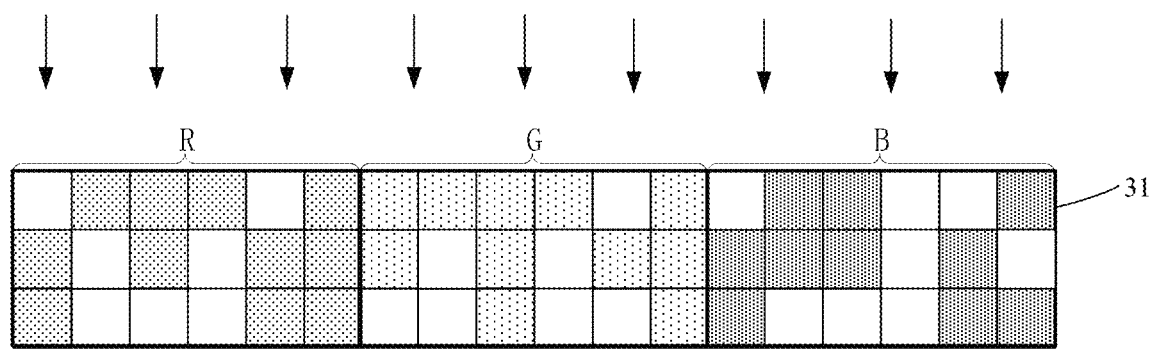
FIG. 9 is a schematic diagram of a mixed layer of light absorption and color resist.

For ease of understanding, reference can be made in conjunction with FIG. 9, which is a schematic diagram of a mixed layer 31 of light absorption and color resist. In other words, a light absorbent is directly filled in the color-resisting layer to form a mixed layer 31 having both light-absorbing and color-resisting functions. Small squares in FIG. 9 are used to represent light-absorbing particles (molecules) and color-resisting particles (molecules) constituting the mixed layer 31. As shown in FIG. 9, it is difficult to ensure uniform distribution of the color-resisting particles (molecules) and the light-absorbing particles (molecules) in the preparation of the mixed layer 31 so that the light absorption and filtering effects of each region of the mixed layer 31 are not uniform. When light enters the mixed layer 31, color shift will occur in different regions, and then affect the uniformity of display.

In addition, compared with the mixed layer 31 of light absorption and color resist, the light absorption layer 2 and the color resist layer 3 in the embodiment of the present disclosure are provided independently, which is conducive to avoiding mutual interference of various components and improving the transmittance of light. For example, the color resist layer 3 is composed of a polymer, a monomer, a solvent, a pigment, a photoinitiator, a dispersant, and the like. The light absorption layer 2 is composed of cyanine dye, alicyclic compound, catalyst, solvent and other components. Therefore, the components of the two are complex and their functions are different. When the light-absorbing material and color-resisting material are mixed, the effect of the original color-resisting material and light-absorbing material may be weakened or eliminated due to the mutual influence of the components. Therefore, the light absorption layer 2 and the color resist layer 3 are independently arranged, which is beneficial to ensure that the preset function is achieved.

The positional relationship of the layer structure in the color film substrate will be described in detail below.

Figure 10:
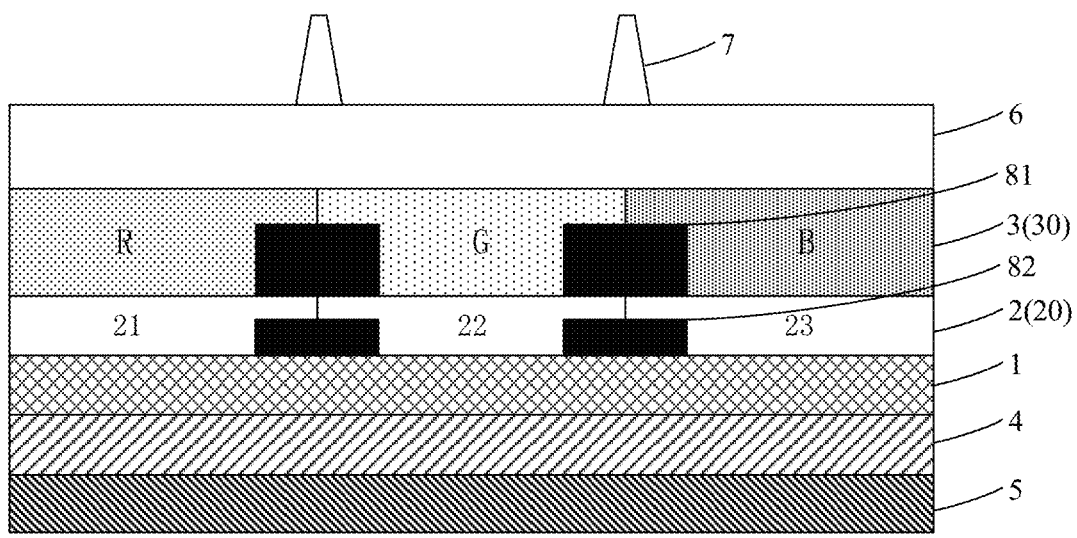
FIG. 10 is a cross-sectional view of a second color film substrate according to embodiment 1 of the present disclosure.
Figure 11:
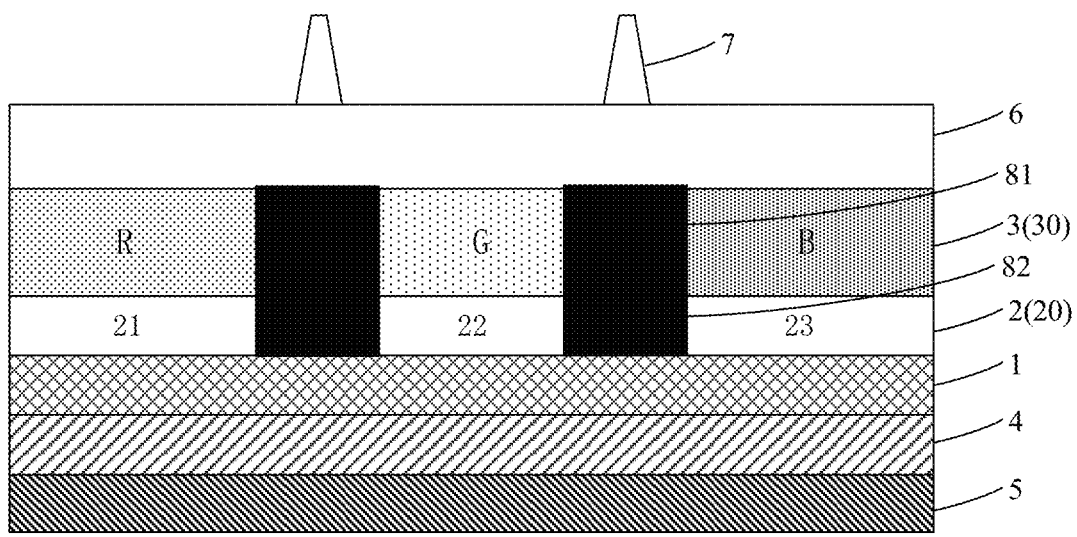
FIG. 11 is a cross-sectional view of a third color film substrate according to embodiment 1 of the present disclosure.

In some embodiments, referring to FIGS. 1, 10 and 11, the light absorption layer 2 and the color resist layer 3 are located on the same side of the substrate 1. That is, the color resist layer 3, the light absorption layer 2 and the substrate 1 are arranged in order in the light output direction. The light output direction can be understood as a direction in which the light emitted from the light source inside the display device propagates to the outside of the display device.

In some embodiments, the color film substrate further includes a first light-shielding layer 81. The light-shielding layer 81 is located between adjacent color resist areas 30. Specifically, the first light-shielding layer 81 may be a black matrix for avoiding light interference in adjacent color resist areas 30. In some examples, a thickness of the first light-shielding layer 81 may be the same as that of the color resist layer 3 in which case the first light-shielding layer 81 is completely located between the adjacent color resist areas 30. In other examples, the thickness of the first light-shielding layer 81 may be smaller than the thickness of the color resist layer 3 in which case the first light-shielding layer 81 occupies only partial area between the adjacent color resist areas 30.

Referring to FIG. 10, the color film substrate further includes a second light-shielding layer 82. The light-shielding layer 82 is located between adjacent light absorption areas 20. Specifically, the second light-shielding layer 82 may be a black matrix to avoid light leakage due to the addition of the light absorption layer 2. For example, the orthographic projection of the second light-shielding layer 82 on the substrate 1 is within or overlaps with the orthographic projection of the first light-shielding layer 81. That is, the size of the second light-shielding layer 82 may be less than or equal to the size of the first light-shielding layer 81, and the two are positioned directly opposite each other. Therefore, it is beneficial to ensure the aperture ratio of the display panel.

It is worth noting that when the orthographic projection of the first light-shielding layer 81 overlaps with the second light-shielding layer 82, they can be manufactured using the same mask thereby facilitating the simplification of the production process. When the orthographic projection of the second light-shielding layer 82 is within the orthographic projection of the first light-shielding layer 81, it is advantageous to increase the space occupied by the light absorption layer 2, thereby improving the effect of light filtering. In some embodiments, when the light absorption layer 2 and the color resist layer 3 are located on the same side of the substrate 1, and the light absorption layer 2 and the color resist layer 3 are disposed adjacent to each other, it is advantageous to further simplify the production process. For example, referring to FIG. 11, the first light-shielding layer 81 and the second light-shielding layer 82 may also be integrated into the same layer, i.e., the first light-shielding layer 81 and the second light-shielding layer 82 may be formed in the same process. By way of example, an initial light absorption layer and an initial color resist layer may be formed on the substrate 1 sequentially, thereafter, the initial light absorption layer and the initial color resist layer are patterned to form the light absorption layer 2 and the color resist layer 3, and an opening for filling with the light-shielding material is formed. The opening is filled with the light-shielding material. The light-shielding material between adjacent light absorption layers 2 serves as the second light-shielding layer 82, and the light-shielding material between adjacent color resist layers 3 serves as the first light-shielding layer 81. Therefore, it is beneficial to further simplify the process steps and reduce the production cost.

With continued reference to FIG. 1, FIG. 10, and FIG. 11, the color film substrate may further include an anti-static layer 4, and the anti-static layer 4 may be located on a different side of the substrate 1 from the light absorption layer 2 and the color resist layer 3, that is, the light absorption layer 2 and the filter layer are located on one side of the substrate 1, and the anti-static layer 4 may be located on the other side of the substrate 1. This design is beneficial to improve the flatness of the color film substrate, so as to improve the uniformity of the display. By way of example, the anti-static layer 4 may be an indium tin oxide layer.

Figure 12:
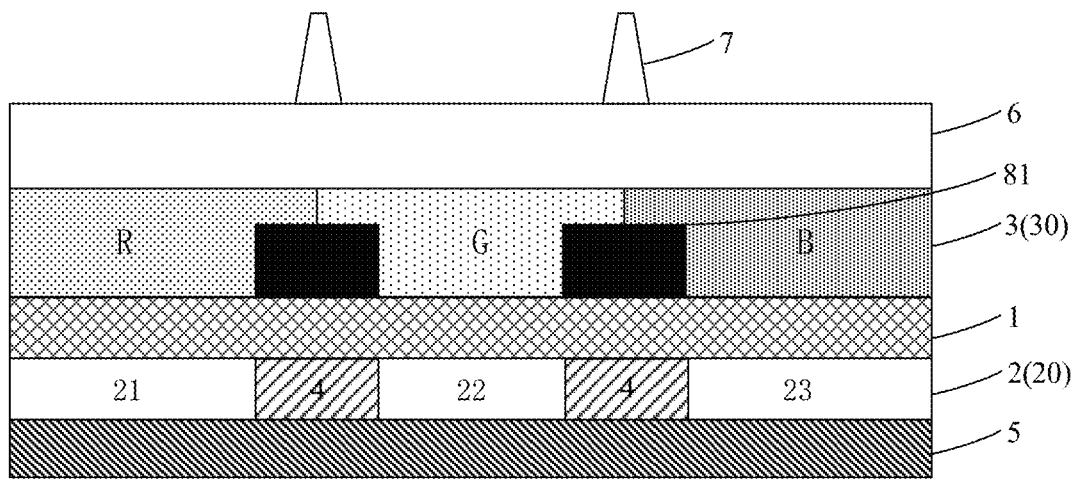
FIG. 12 is a cross-sectional view of a fourth color film substrate according to embodiment 1 of the present disclosure.
Figure 13:
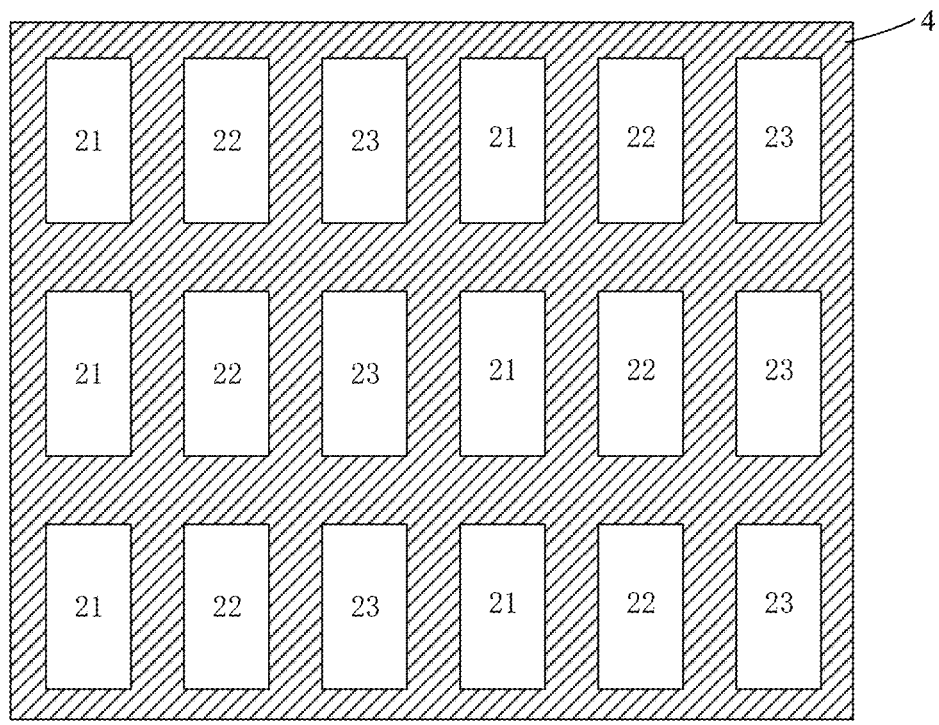
FIG. 13 is a top view of a light absorption layer and an anti-static layer in the color film substrate shown in FIG. 12.
Figure 14:
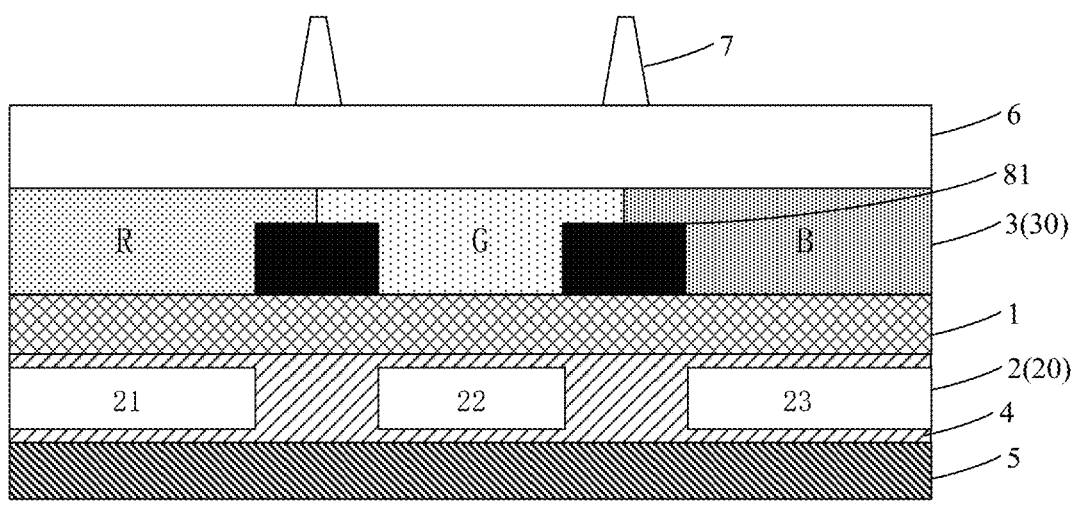
FIG. 14 is a cross-sectional view of a fifth color film substrate according to embodiment 1 of the present disclosure.

Referring to FIGS. 12-14, the light absorption layer 2 and the color resist layer 3 are located on opposite sides of the substrate 1. That is, the color resist layer 3, the substrate 1 and the light absorption layer 2 are arranged in order in the light output direction. It is worth noting that the substrate 1 is equivalent to an isolation layer between the light absorption layer 2 and the color resist layer 3, which is beneficial to avoid interference between the components of the two layers, thereby ensuring the stability of each film layer.

With continued reference to FIGS. 12-14, the anti-static layer 4 is located at least between adjacent light absorption areas 20. That is, the anti-static layer 4 can be arranged in the same layer as the light absorption layer 2 to avoid the problem of unevenness in the liquid crystal display cell caused by the addition of the anti-static layer 4, thereby improving the uniformity of display.

Specifically, with reference to FIGS. 12-13, FIG. 12 is a cross-sectional view, and FIG. 13 is a top view of the anti-static layer 4 and the light absorption layer 2 shown in FIG. 12. The anti-static layer 4 may be located only between adjacent light absorption areas 20. In other words, the thickness of the anti-static layer 4 may be the same as that of the light absorption layer 2.

In some embodiments, the orthographic projection of the anti-static layer 4 located between adjacent light absorption areas 20 on the substrate 1 overlaps with the orthographic projection of the first light-shielding layer 81. That is, the size of the first light-shielding layer 81 is the same as the size of the anti-static layer 4, and the two are positioned directly opposite each other. It should be noted that since the first light-shielding layer 81 is used to block light, light absorption is not required at a position corresponding to the first light-shielding layer 81, and the anti-static layer 4 is arranged corresponding to the first light-shielding layer 81, preventing the anti-static layer 4 from occupying a position where light need to be filtered, thereby avoiding affecting the light absorption effect.

Referring to FIG. 14, in some embodiments, the anti-static layer 4 includes an upper anti-static layer, a lower anti-static layer and a middle anti-static layer. The upper anti-static layer is located on a top surface of the light absorption layer 2. The lower anti-static layer is located on a bottom surface of the light absorption layer 2. The middle anti-static layer is located between adjacent light absorption areas 20 and connected to the upper anti-static layer and the lower anti-static layer. That is, the anti-static layer 4 can maintain a large volume, thereby ensuring its own sheet resistance to improve the anti-static effect. In some examples, the orthographic projection of the middle anti-static layer on the substrate 1 overlaps with the orthographic projection of the first light-shielding layer 81.

Referring to FIGS. 1 and FIGS. 10-14, the color film substrate further includes a planarizing layer 6. The planarizing layer 6 covers a surface of the light absorption layer 2 away from the substrate 1. The planarizing layer 6 can be used to improve the flatness of the color film substrate and further ensure the uniformity of display.

With continued reference to FIGS. 1 and 10-14, the color film substrate further includes a support post 7. The support post 7 is located on a side of the planarizing layer 6 away from the color resist layer 3. The support post 7 can support the liquid crystal cell to enable the liquid crystal molecules to be accommodated inside the liquid crystal cell.

Referring to FIGS. 1 and 10-14, the color film substrate further includes a polarizer 5. Compared with other film layers, the polarizer 5 is closest to the light output side. The polarizer 5 can control the transmission of light beams in a specified direction, and other light beams parallel to the polarization angle will be absorbed, only transmitting light beams perpendicular to the polarization angle.

To sum up, the embodiment of the present disclosure increases the light absorption area 20 corresponding to each color resist area 30 to absorb stray light transmitted by the color resist area 30, thereby improving the chroma of RGB monochromatic light, enriching the display effect of the display panel and improving the color gamut of the display panel. It can also avoid the damage of high-energy short-wave blue light and near-infrared light to human eyes.

Embodiment 2

Figure 15:
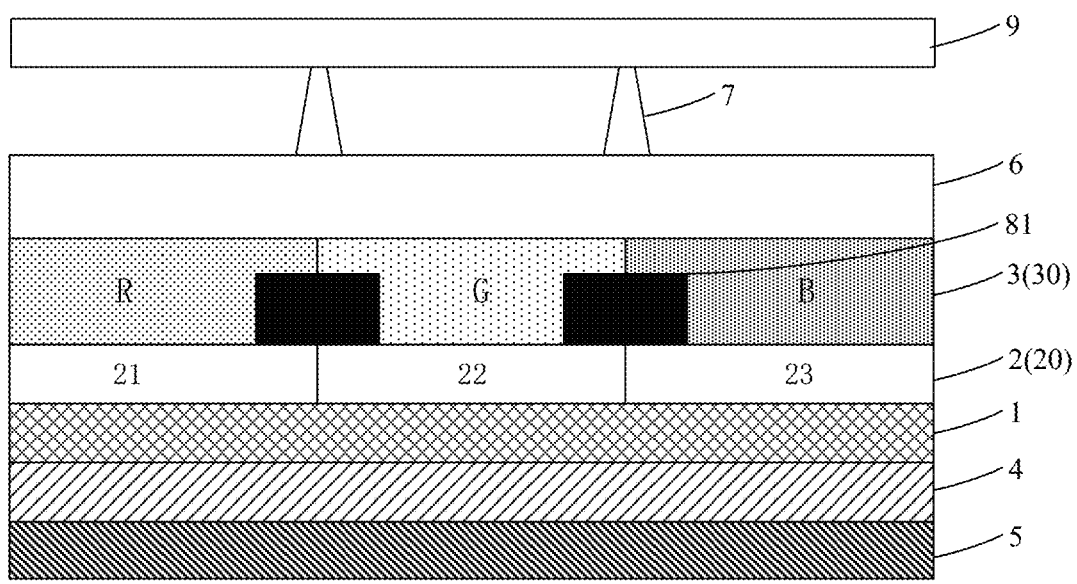
FIG. 15 is a cross-sectional view of a display panel according to embodiment 2 of the present disclosure.

Referring to FIG. 15, the embodiment of the present disclosure also provides a display panel, which includes an array substrate 9 and a color film substrate provided in embodiment 1. The color film substrate and the array substrate 9 are arranged by cell assembling. The same or similar parts of this embodiment and embodiment 1 are referred to the detailed description of the preceding embodiments and will not be repeated here.

The display panel also includes a liquid crystal layer arranged between the array substrate 9 and the color film substrate. Driven by the array substrate 9, liquid crystal molecules in the liquid crystal layer deflect, so as to adjust the intensity of light transmitted through the color film substrate. After the light passes through the color film substrate, different colors can be displayed.

Embodiment 3

The embodiment of the present disclosure also provides a manufacturing method of a color film substrate. The method includes: forming a color resist layer 3 on the substrate 1, the color resist layer 3 including a red color resist area R, a green color resist area G and a blue color resist area B; and forming the light absorption layer 2 on the substrate 1, the light absorption layer 2 including first to third light absorption areas 23, the first light absorption area 21 being disposed in correspondence with the red color resist area R, the second light absorption area 22 being disposed in correspondence with the green color resist area G, and the third light absorption area 23 being disposed in correspondence with the blue color resist area B.

An example will be given below.

In one example, the manufacturing method may be applied to forming the color film substrate as shown in FIG. 1.

Specifically, the method includes forming the first light absorption area 21, the second light absorption area 22, and the third light absorption area 23 sequentially on the substrate 1 to form the light absorption layer 2; forming the first light-shielding layer 81 on the light absorption layer 2; and forming the color resist layer 3, the planarizing layer 6 and the support post 7 sequentially after the formation of the first light-shielding layer 81.

In another example, the manufacturing method may be applied to forming the color film substrate as shown in FIG. 10.

Specifically, the method includes forming the second light-shielding layer 82 on the substrate 1; forming the first light absorption area 21, the second light absorption area 22, and the third light absorption area 23 sequentially on the substrate 1 to form the light absorption layer 2 after the formation of the second light-shielding layer 82; forming the first light-shielding layer 81 on the light absorption layer 2; and forming the color resist layer 3, the planarizing layer 6 and the support post 7 sequentially after the formation of the first light-shielding layer 81. It is worth noting that the same mask may be used in the formation of the first light-shielding layer 81 and the second light-shielding layer 82.

In another example, the manufacturing method may be applied to forming the color film substrate as shown in FIG. 11.

Specifically, an initial light absorption layer and an initial color resist layer may be formed on the substrate 1 sequentially, and thereafter, a part of the initial light absorption layer and the initial color resist layer are removed to form an opening for filling with the light-shielding material, and the remaining initial light absorption layer and the initial color resist layer serve as the light absorption layer 2 and the color resist layer 3, respectively. The opening is filled with the light-shielding material. The light-shielding material between adjacent light absorption layers 2 serves as the second light-shielding layer 82, and the light-shielding material between adjacent color resist layers 3 serves as the first light-shielding layer 81.

Alternatively, a light-shielding material layer is formed on the substrate 1, and the light-shielding material layer is patterned to form the light-shielding layer. Thereafter, the color resist layer 3 and the light absorption layer 2, which are stacked between adjacent light-shielding layers, are formed sequentially, with the light-shielding layer between the adjacent color resist layers 3 serving as the first light-shielding layer 81 and the light-shielding layer between the adjacent light absorption layers 2 serving as the second light-shielding layer 82.

Thereafter, the anti-static layer 4 is formed under the substrate 1, and the polarizer 5 is attached.

Since with the manufacturing method, the first light-shielding layer 81 and the second light-shielding layer 82 can be formed simultaneously by the same process, it is advantageous to simplify the production process and further to reduce the production cost.

In another example, the manufacturing method may be applied to forming the color film substrate as shown in FIGS. 12-13.

Specifically, the method includes forming the first light-shielding layer 81, the color resist layer 3, the planarizing layer 6 and the support post 7 on the substrate 1; then forming the first light absorption area 21, the second light absorption area 22, and the third light absorption area 23 sequentially under the substrate 1; forming the anti-static layer 4 between adjacent light absorption areas 20; and forming the anti-static layer 4, after that attaching the polarizer 5.

In another example, the manufacturing method may be applied to forming the color film substrate as shown in FIG. 14.

Specifically, the method includes forming the first light-shielding layer 81, the color resist layer 3, the planarizing layer 6 and the support post 7 on the substrate 1; depositing the anti-static material under the substrate 1 for the first time, and patterning the deposited anti-static material to form an upper antistatic layer and a middle anti-static layer; forming the first light absorption area 21, the second light absorption area 22 and the third light absorption area 23 sequentially in the middle anti-static layer arranged at intervals to form the light absorption layer 2; depositing the anti-static material on the bottom surface of the adjacent light absorption layer 2, thereby forming a lower anti-static layer, and the upper anti-static layer, the lower anti-static layer and the middle anti-static layer constituting the anti-static layer 4; and attaching the polarizer 5, after forming the anti-static layer 4.

The color film substrate can be manufactured based on the above methods, but the embodiments of the present disclosure are not limited to the above methods.

In the description of this description, illustrations of the reference terms "some embodiments", "exemplified", etc. mean that specific features, structures, materials, or features described in connection with the embodiment or example are included in at least one embodiment or example of the present disclosure. In the description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although the embodiments of the present disclosure have been shown and described above, understandably, the above-described embodiments are exemplary and cannot be construed as limiting the present disclosure. Those of ordinary skill in the art may make changes, modifications, substitutions and modifications to the above-described embodiments within the scope of the present disclosure. Therefore, any changes or modifications made in accordance with the claims and descriptions of the present disclosure should fall within the scope of the present disclosure.

What is claimed is:

1. A color film substrate comprising:
    a substrate;
    a color resist layer arranged on the substrate, wherein the color resist layer comprises a red color resist area, a green color resist area and a blue color resist area; and
    a light absorption layer located on the substrate, wherein the color resist layer and the light absorption layer are arranged in sequence in a light output direction, and wherein the light absorption layer comprises first light absorption area, second light absorption area and third light absorption area;
    wherein the first light absorption area is correspondingly arranged with the red color resist area, the second light absorption area is correspondingly arranged with the green color resist area, and the third light absorption area is correspondingly arranged with the blue color resist area; and
    wherein the first light absorption area absorbs near-infrared light transmitted by the red color resist area, the second light absorption area absorbs yellow light transmitted by the green color resist area, and the third light absorption area absorbs short-wave blue light transmitted by the blue color resist area.

2. The color film substrate according to claim 1, wherein the light absorption layer and the color resist layer are located on a same side of the substrate.

3. The color film substrate according to claim 2, further comprising:
    a first light-shielding layer located between adjacent color resist areas; and
    a second light-shielding layer located between adjacent light absorption areas.

4. The color film substrate according to claim 3, wherein an orthographic projection of the second light-shielding layer on the substrate is located within an orthographic projection of the first light-shielding layer or overlaps with an orthographic projection of the first light-shielding layer.

5. The color film substrate according to claim 1, wherein the light absorption layer and the color resist layer are located at opposite sides of the substrate.

6. The color film substrate according to claim 5, wherein the color film substrate further comprises an anti-static layer located at least between adjacent light absorption areas.

7. The color film substrate according to claim 6, further comprising a first light-shielding layer located between adjacent color resist areas, wherein an orthographic projection on the substrate of the anti-static layer located between the adjacent light absorption areas overlaps with an orthographic projection of the first light-shielding layer.

8. The color film substrate according to claim 6, wherein the anti-static layer comprises:
    an upper anti-static layer located on a top surface of the light absorption layer;
    a lower anti-static layer located on a bottom surface of the light absorption layer; and
    a middle anti-static layer located between adjacent light absorption areas and connected to the upper anti-static layer and the lower anti-static layer.

9. The color film substrate according to claim 1, wherein the light absorption layer has a thickness of 1.0 µm to 2.0 µm.

10. A display panel comprising:
    an array substrate; and
    a color film substrate, comprising:
        a substrate;
        a color resist layer arranged on the substrate, wherein the color resist layer comprises a red color resist area, a green color resist area and a blue color resist area; and a light absorption layer located on the substrate, wherein the color resist layer and the light absorption layer are arranged in sequence in a light output direction, and wherein the light absorption layer comprises first light absorption area, second light absorption area and third light absorption area;

wherein the first light absorption area is correspondingly arranged with the red color resist area, the second light absorption area is correspondingly arranged with the green color resist area, and the third light absorption area is correspondingly arranged with the blue color resist area; and wherein the first light absorption area absorbs near-infrared light transmitted by the red color resist area, the second light absorption area absorbs yellow light transmitted by the green color resist area, and the third light absorption area absorbs short-wave blue light transmitted by the blue color resist area;

wherein the color film substrate and the array substrate are arranged by cell assembling.

11. The display panel according to claim 10, wherein the light absorption layer and the color resist layer are located on a same side of the substrate.

12. The display panel according to claim 11, further comprising:
a first light-shielding layer located between adjacent color resist areas; and
a second light-shielding layer located between adjacent light absorption areas.

13. The display panel according to claim 12, wherein an orthographic projection of the second light-shielding layer on the substrate is located within an orthographic projection of the first light-shielding layer or overlaps with an orthographic projection of the first light-shielding layer.

14. The display panel according to claim 10, wherein the light absorption layer and the color resist layer are located at opposite sides of the substrate.

15. The display panel according to claim 14, wherein the color film substrate further comprises an anti-static layer located at least between adjacent light absorption areas.

16. The display panel according to claim 15, further comprising a first light-shielding layer located between adjacent color resist areas, wherein an orthographic projection on the substrate of the anti-static layer located between the adjacent light absorption areas overlaps with an orthographic projection of the first light-shielding layer.

17. The display panel according to claim 15, wherein the anti-static layer comprises:
an upper anti-static layer located on a top surface of the light absorption layer;
a lower anti-static layer located on a bottom surface of the light absorption layer; and
a middle anti-static layer located between adjacent light absorption areas and connected to the upper anti-static layer and the lower anti-static layer.

18. The display panel according to claim 10, wherein the light absorption layer has a thickness of 1.0 μm to 2.0 μm.

\* \* \* \* \*